Nov. 6, 1928.  
J. A. HEANY  
PNEUMATIC SHOCK ABSORBER  
Original Filed May 25, 1922
1,690,110
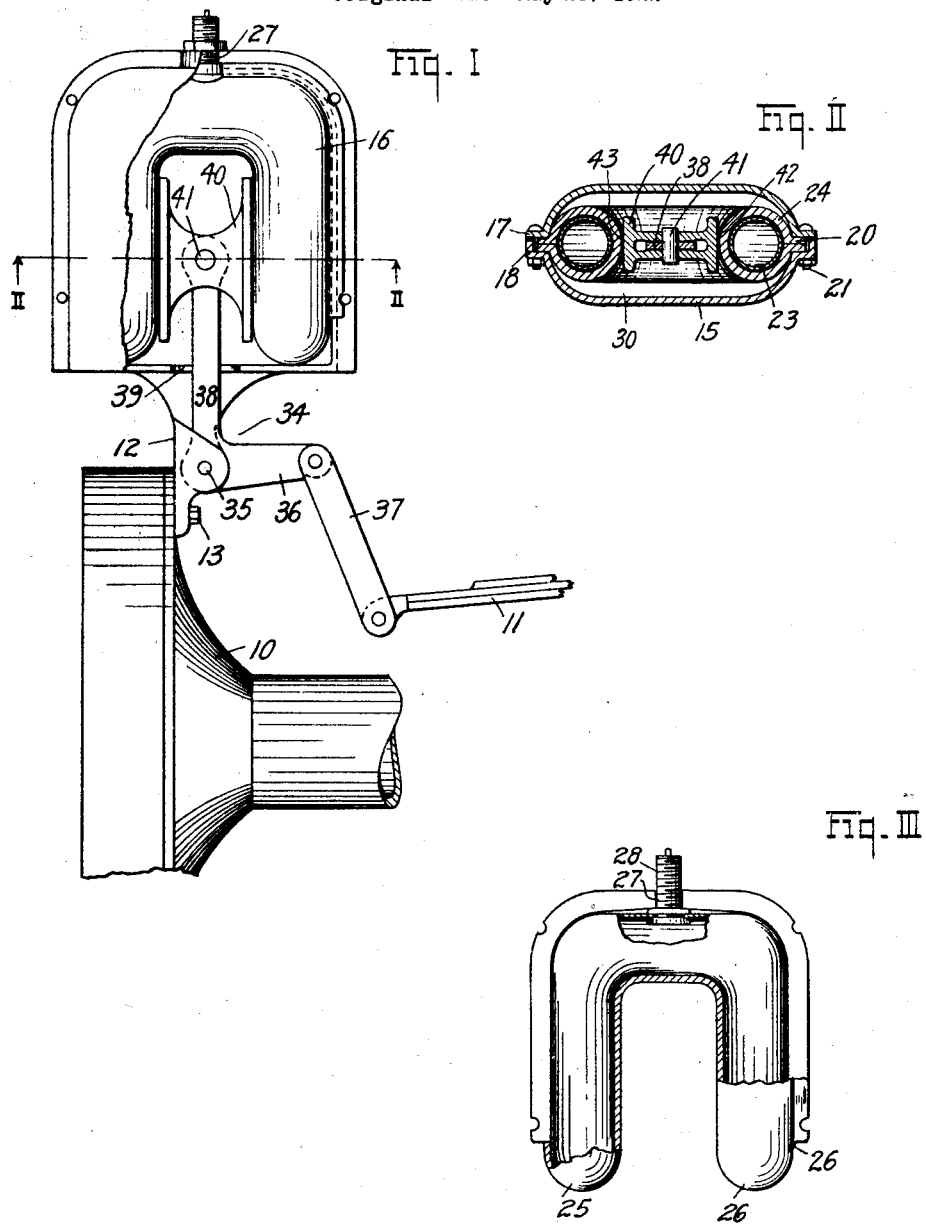
INVENTOR.  
John Allen Heany  
BY  
Chester H Braselton  
ATTORNEYS.

Patented Nov. 6, 1928.

1,690,110

UNITED STATES PATENT OFFICE.

JOHN ALLEN HEANY, OF NEW HAVEN, CONNECTICUT, ASSIGNOR TO HEANY LABORATORIES, INC., OF NEW HAVEN, CONNECTICUT, A CORPORATION OF CONNECTICUT.

PNEUMATIC SHOCK ABSORBER.

Application filed May 25, 1922, Serial No. 563,650. Renewed September 20, 1926.

The present invention relates to a pneumatic shock absorber for use with vehicles in which a double flexible rubber or other tube containing air under pressure is used, for example, interposed between relatively movable members of a vehicle spring suspension, to dampen or absorb shock, said tube including an inner and outer casing, whereby the desired combined flexible and air retaining capacities of the inner tube are retained and a strengthening wear resisting and energy absorbing body portion is also provided, to be used with a retaining receptacle or casing and a cooperating compressing member, said casing being of such shape as not to contact with the air containing tube in operation, but arranged to securely clamp the pneumatic tube with the inner and outer parts in position along a central line or portion thereof, and said compressing member arranged to operate in a manner to reduce to a minimum relative friction between the compressing element and tube and consequent wear and disadvantages flowing therefrom, and to also operate to uniformly distribute the pressure to said pneumatic means.

Various other objects are within the scope of this invention, such as relate to the arrangement of the related elements or the structure, and to various details of construction and to economies of manufacture and numerous other features as will be apparent from consideration of the drawings and related description of a form of the invention, which may be preferred.

Referring to the drawings,

Fig. I is a side elevation with parts broken away for clearness of an embodiment of this invention.

Fig. II is a section on line II—II of Fig. I, and

Fig. III is a view of the inner tube and casing detached.

I have illustrated my invention in use in a vehicle spring suspension showing an axle casing 10 and vehicle spring 11. A bracket 12 is bolted by bolts 13 to the axle casing 10 and carries a two part receptacle 15 adapted to retain a U-shaped pneumatic shock absorbing means 16. Receptacle 15 is provided with flanges 17 and 18 shaped as shown in Fig. II to receive and clamp in position the ridge or edges 20 of the pneumatic means 16. Bolts 21 may be used for this purpose.

The pneumatic means 16 comprises an inner relatively thin and flexible rubber tube 23 and an outer, thicker, tougher and strong but flexible casing 24. As shown in Fig. III, the casing 24 is made in two parts joined merely at the lower ends 25 and 26. Thus the inner tube 23 may be readily inserted in the casing 24 by bending the two halves of the casing 24 apart and inserting the legs of the inner tube 23 in place. The outer casing 24 is provided with an opening 27 and the inner tube with an inflating valve 28 of any desired construction.

The flanges 17 and 18 of the retaining receptacle 15 clamp the flanges 20 of the outer tube 24 securely in fixed position. A clear space 30 is located between the casing 15 and tubes 23 and 24.

A bell crank lever 34 is pivoted at 35 to the bracket 12 and one arm 36 thereof is pivoted through link 37 to spring 11, while the other arm 38 extends upwardly through an opening 39 in the bottom of the casing 15. A cross head 40 is pivoted at 41 to the arm 38, the cross head contacting at 42 and 43 with the inner faces of the legs of the U-shaped outer casing 24 of the pneumatic member 16.

The operation will be apparent and it will be seen that as the axle 10 and spring 11 approach or recede from each other, the bell crank 34 moves in one direction or the other while the cross head 40 may move substantially rectilinearly without moving casing 24 and evenly distributes the pressure to the cushioning member 16 which resists movement of the bell crank 34 and hence, movement of axle 10 and spring 11 in both directions.

By clamping the casing 24 rigidly to the casing 15, allowing a space 30 and providing the pivoted cross head 40, friction between parts is entirely eliminated. The pressure of the air in the inner tube may be varied as desired but, of course, the pressure must be great enough to support the cross head 40 against the weight of the vehicle.

The invention is an improvement over my co-pending application Serial No. 487,491, filed July 25th 1921 and entitled "Air spring shock absorber", in which I reserve the right to claim the invention broadly.

It is apparent that, within the spirit of the invention modifications and different arrangements may be made other than as herein disclosed, and the present disclosure is illustrative merely, the invention comprehending all variations illustrated. What I desire to claim and secure by Letters Patent of the United States is:

1. In a shock absorber for vehicle spring suspensions, an inner U-shaped flexible air container, an outer flexible casing therefor, a member pivotally mounted on one of two relatively movable parts in said vehicle spring suspension, said member having a plurality of arms, one of which is connected with the other of said relatively movable parts and the other of which is located between opposite parts of said outer U-shaped container casing, and a rectilinearly moving compressing element connected with said last mentioned arm and operated thereby for engagement with said air container.

2. In a shock absorber for vehicle spring suspensions, a U-shaped flexible compressed air container, a similarly shaped flexible outer casing enclosing and retaining the same, a receptacle for said container and casing, means to clamp said outer casing to said receptacle, a compressing member therefor pivotally mounted on one of two relatively movable members in said vehicle spring suspension, said compressing member comprising a bell crank lever having a plurality of arms, one of which is connected with the other of said relatively movable members and the other arm located between the opposite parts of said U-shaped casing, the movement of which in either direction is resisted by the air compressed in said container, and means to uniformly distribute the pressure between said last mentioned arm and air container casing.

3. In a shock absorber for vehicle spring suspensions, a housing secured to one of two relatively movable members in said vehicle spring suspension, a bell crank lever fulcrumed on one of said relatively movable members and having one arm pivotally connected to the other of said members and a free arm extending within said housing, an air bag having portions extending on opposite sides of said free arm, and a flexible, wear-resisting casing enveloping said air bag.

4. In a shock absorber for vehicle spring suspensions, a bracket secured to one of two relatively movable members in the vehicle spring suspension, a casing carried by said bracket, an inverted vertically arranged two part U-shaped flexible compressed air cushioning member having inner and outer tubes, a flange on said outer tube, said casing spaced from said outer tube except at said flange, means to clamp said flange to said casing, a bell crank lever pivoted to said bracket having a free arm within said casing between the legs of said U-shaped members, a link pivotally connected to the other arm of said bell crank and to the other of said relatively movable members, and a compression head pivoted to said free arm of said bell crank lever.

5. In a shock absorber for vehicle spring suspensions, a bracket secured to one of two relatively movable members in the vehicle spring suspension, a casing carried by said bracket, an inverted vertically arranged U-shaped flexible two part compressed air cushioning member clamped rigidly at a circumferential line to and otherwise spaced from said casing, a bell crank lever pivoted to said bracket having a free arm within said casing between the legs of said U-shaped member, a link pivotally connected to the other arm of said bell crank and to the other of said relatively movable members, and a cross head pivoted on said free arm and maintained in contact with one of said legs in operation of said mechanism.

6. In a shock absorber for vehicle spring suspensions, a housing secured to one of two relatively movable members in said vehicle spring suspension, a bell crank lever fulcrumed on the member to which the housing is secured and having one arm pivotally connected to the other of said relatively movable members, and a free arm extending within said housing, an air bag having portions extending on opposite sides of said free arm, and a flexible wear-resisting casing enveloping said air bag.

7. In a shock absorber for vehicle spring suspensions, a housing secured to one of two relatively movable members in said vehicle spring suspension, a bell crank lever fulcrumed on a part moving with said housing and having one arm pivotally connected to the other of said relatively movable members, and a free arm extending within said housing, an air bag having portions extending on opposite sides of said free arm, and a flexible wear-resisting casing enveloping said air bag and secured to said housing.

8. In a shock absorber for vehicle spring suspensions, a two-part housing secured to one of two relatively movable members in said vehicle spring suspension, a bell crank lever fulcrumed on a part moving with said housing and having one arm pivotally connected with the other of said relatively movable members, and a free arm extending within said housing, an air bag having portions extending on opposite sides of said free arm, and a flexible wear-resisting casing enveloping said air bag and clamped between the parts of said housing.

9. Pneumatic cushioning means for shock absorbers for vehicle spring suspensions, comprising a flexible U-shaped air bag and a flexible wear-resisting U-shaped casing enveloping said air bag, the outer side wall of said casing being slit up to points near the free ends of the legs thereof.

10. Pneumatic cushioning means for shock absorbers for vehicle spring suspensions, comprising a U-shaped rubber air bag and a U-shaped flexible wear-resisting casing enveloping said air bag and having a slit in the outer side wall thereof running from a point near the free end of one leg to a point near the free end of the other leg, said casing being provided with flanges at the edges of said slit.

11. In a shock absorber for vehicle spring suspensions, a resilient gas bag; means to compress all of the gas in said gas bag upon relative movement in either direction between a vehicle and the running gear therefor; and a protective covering for said gas bag.

In testimony whereof, I affix my signature.

JOHN ALLEN HEANY.